United States Patent Office 3,468,753
Patented Sept. 23, 1969

3,468,753
METHOD OF PRODUCING POLYMER-METAL LAMINATES AND PRODUCTS THEREOF
Gerald G. Vincent and Joseph E. Burkholder, Midland, Mich., assignors to The Dow Chemical Company, Midland, Mich., a corporation of Delaware
No Drawing. Filed Mar. 10, 1965, Ser. No. 438,769
Int. Cl. B32b 15/08, 15/04; B44d 1/36
U.S. Cl. 161—216         13 Claims

ABSTRACT OF THE DISCLOSURE

A laminate comprising a metal sheet of a material such as aluminum and a film of a graft copolymer of ethylene and an ethylenically unsaturated carboxylic acid such as acrylic acid has an improved and high degree of adhesion by employing between about 35 and about 75 percent by weight finely divided inorganic particles such as aluminum particles dispersed in the copolymer film. The laminate is fabricated by subjecting a composite of a copolymer film containing the finely divided inorganic particles and a metal substrate to elevated temperatures and pressure for a period of time sufficient to bond the copolymer film to the metal substrate.

---

This invention relates to a method of producing laminates having improved polymer to metal adhesion. More particularly, it relates to a method of producing laminates comprising a copolymer of ethylene and an ethylenically unsaturated carboxylic acid and at least one metal substrate, the copolymer having interspersed therein finely divided inorganic particles.

It is known in the art to coat metal substrates with various polymers to obtain a polymer-metal laminate. It is also known that polymers of ethylene, such as copolymers of ethylene and ethylenically unsaturated carboxylic acid, are particularly desirable because of their adhesive properties. However, the degree of adhesion obtained from such a copolymer is limited by the amount of acid comonomer that can be incorporated into the copolymer.

It has now been found that the degree of adhesion of the above-described copolymer can be substantially increased without increasing the amount of acid comonomer. This is achieved by incorporating into the adhesive copolymer finely divided inorganic particles.

The present invention is accomplished in a method which comprises (1) contacting at least one metal substrate with a graft copolymer composition comprising ethylene and an ethylenically unsaturated carboxylic acid, said graft copolymer having interspersed therein from about 35 to about 75 percent by weight based on the weight of the total mixture of finely divided inorganic particles (2) subjecting the polymer-metal combination to temperatures of from about 160° C. to about 225° C. and pressures of at least 150 p.s.i. for a time sufficient to cause the copolymer to become adhesively bonded to the metal substrate and (3) cooling the resulting laminate.

The polymer employed in this invention comprises a graft copolymer of a major proportion of ethylene and from about 3 to about 20 percent by weight based on the copolymer of an acidic comonomer selected from α,β-ethylenically unsaturated mono- and polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate. It is preferred that the ethylenically unsaturated carboxylic acid be present in the copolymer in an amount from about 6 percent to about 10 percent by weight based on the weight of the copolymer.

It has been found that if finely divided metallic powders are compounded into the adhesive copolymer, such as by means of a milling process, in amounts of from about 35 to about 75 percent by weight based on the weight of the total mixture, the resulting mixture has a substantially higher degree of adhesiveness than the copolymer alone without the filler. Fillers which may be employed in the adhesive copolymer are finely divided particles of metals, metal oxides and clay-like materials that will advantageously increase the adhesion of a polymer to a metal substrate. Specific examples of such finely divided particles include aluminum, iron, zinc, copper and clay-like materials such as montmorillonite, illite, kaolinite, vermiculite and the like. The particles should have a size of less than 140 microns and preferably less than 40 microns in diameter.

The metal substrates employed in the invention may be surface-treated to gain additional adhesion of the polymer to the metal substrate where additional bond strength is desired.

Bonding temperatures should be in the range of from about 160° C. to about 225° C. and preferably from about 180° C. to about 210° C. Temperatures above 230° C. are not desirable since the adhesive copolymer begins to degrade. Temperatures below 160° C. are not sufficient to effect the adhesive bond between the copolymer and the metal substrate. Pressure of at least 150 p.s.i. should be employed to effect the adhesive bond.

The laminate products of the present invention may be used for producing heat, moisture and chemical resistant structures, panels, various types of containers, and the like.

The following examples are illustrative of the invention and are not intended to limit the scope thereof.

EXAMPLE 1

A 25 g. sample of high density polyethylene-acrylic acid graft copolymer containing about 7 percent acrylic acid and having a M.I. of 0.91 was blended with 75 g. of aluminum powder on a heated roll mill at a temperature of 180° C. for about 2 minutes. A portion of the blend was compression molded into a film on a hydraulic press under 10,000 lbs. platen pressure and at a temperature of 180° C. for about 2 minutes. The film was placed on a section of soft annealed aluminum foil 6" x 8" x 0.0045" between polyethylene terephthalate covered platen plates and the combination was subjected to a temperature of about 180° C. and a pressure of about 15,000 lbs. platen for a period of about 3 minutes.

The peel strength of the resulting laminate was tested on an Instron testing machine according to ASTM D–903–49 except that a cross-head separation rate of 4 inches per minutes was used. The laminate had a peel strength of 14 lbs. per inch width. Another laminate having no aluminum powder in the copolymer was tested as above and had a peel strength of 6 lbs. per inch width.

EXAMPLE 2

The procedure of Example 1 was substantially repeated except that iron powder (200 mesh) was blended with the copolymer. The peel strength was 13 lbs. per inch width.

EXAMPLE 3

The procedure of Example 1 was substantially repeated except that 37 g. of high density polyethylene-acrylic acid graft copolymer and 63 g. of zinc powder (200 mesh) were blended together. The peel strength was found to be 12 lbs. per inch width.

EXAMPLE 4

The procedure of Example 1 was substantially repeated except that 25 g. of high density polyethylene-acrylic acid graft copolymer was blended with 75 g. of copper powder (200 mesh). The peel strength was found to be 10 lbs. per inch width.

EXAMPLE 5

The procedure of Example 1 was substantially repeated except that 60 g. of high density polyethylene-acrylic acid graft copolymer was blended with 60 g. of Bentonite Clay (80 percent passing through a 325 mesh screen). The peel strength was found to be 18.4 lbs. per inch width.

EXAMPLE 6

The procedure of Example 1 was substantially repeated except that 60 g. of high density polyethylene-acrylic acid graft copolymer was blended with 40 g. of wollastonite clay. The peel strength was found to be 11.0 lbs. per inch width.

What is claimed is:

1. A method for producing a polymer-metal laminate having improved adhesion between the polymer and metal substrate which comprises (1) contacting at least one metal substrate with a graft copolymer composition comprising ethylene and an ethylenically unsaturated carboxylic acid, said copolymer having interspersed therein finely divided inorganic particles in an amount from about 35 to about 75 percent by weight based on the weight of the total mixture, said particles having a size of less than 140 microns in diameter, (2) subjecting the polymer-metal combination to temperatures of from about 160° C. to about 225° C. and pressures of at least 150 p.s.i. for a time sufficient to cause the copolymer to become adhesively bonded to the metal substrate and (3) cooling the resulting laminate.

2. The method according to claim 1 wherein the graft copolymer is acrylic acid grafted onto high density polyethylene, said acrylic acid being present in an amount from about 3 percent to about 20 percent by weight based on the weight of the copolymer.

3. The method according to claim 1 wherein the finely divided inorganic particles are aluminum.

4. The method according to claim 1 wherein the finely divided inorganic particles are iron.

5. The method according to claim 1 wherein the finely divided inorganic particles are zinc.

6. The method according to claim 1 wherein the finely divided inorganic particles are copper.

7. The method according to claim 1 wherein the finely divided inorganic particles are clays.

8. The method according to claim 1 wherein the finely divided inorganic particles have a particle size of less than 40 microns in diameter.

9. A method for producing a polymer-metal laminate having improved adhesion between the polymer and metal substrate which comprises (1) contacting an aluminum substrate with a high density polyethylene-acrylic acid graft copolymer, said copolymer having interspersed therein about 75 percent by weight based on the weight of the total mixture of finely divided aluminum powder, said particles having a size of less than 40 microns in diameter, (2) subjecting the copolymer-metal combination to a temperature of about 180° C. and pressure of about 200 p.s.i. for a period of about 3 minutes and (3) cooling the resulting laminate.

10. An article of manufacture comprising a laminate of at least one metal substrate adhesively bonded to a layer of a graft copolymer of ethylene and an ethylenically unsaturated carboxylic acid, said copolymer having interspersed therein finely divided inorganic particles in an amount from about 35 to about 75 percent by weight based on the weight of the total mixture, said particles having a size of less than 140 microns in diameter.

11. The article according to claim 10 wherein the metal substrate is aluminum.

12. The article according to claim 10 wherein the graft copolymer is acrylic acid grafted onto high density polyethylene, said acrylic acid being present in the copolymer in an amount of from about 3 percent to about 20 percent based on the weight of the copolymer.

13. An article of manufacture comprising a laminate of at least one aluminum substrate adhesively bonded to a layer of a graft copolymer of ethylene and acrylic acid, said copolymer having interspersed therein finely divided particles of aluminum in an amount of about 75 percent by weight based on the weight of the total mixture, said particles having a size of less than 40 microns in diameter.

References Cited

UNITED STATES PATENTS

| | | | |
|---|---|---|---|
| 2,970,129 | 1/1961 | Rugg et al. | 260—878 |
| 3,043,716 | 7/1962 | Busse et al. | |
| 3,143,364 | 8/1964 | Klein | 161—216 |

FOREIGN PATENTS

| | | |
|---|---|---|
| 876,535 | 9/1961 | Great Britain. |

ROBERT F. BURNETT, Primary Examiner

L. M. CARLIN, Assistant Examiner

U.S. Cl. X.R.

117—128.4, 132; 156—334; 161—162; 260—41